United States Patent
Jureczki et al.

(10) Patent No.: US 7,930,703 B2
(45) Date of Patent: Apr. 19, 2011

(54) SYSTEM AND METHOD FOR PROVIDING ACCESS TO MULTIMEDIA CONTENT VIA A SERIAL CONNECTION

(75) Inventors: Elaine Jureczki, San Antonio, TX (US); Roger Cockrell, San Antonio, TX (US); Brian Wilson, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 879 days.

(21) Appl. No.: 11/592,708

(22) Filed: Nov. 3, 2006

(65) Prior Publication Data

US 2008/0109838 A1    May 8, 2008

(51) Int. Cl.
*G06F 3/00* (2006.01)
*H04N 7/16* (2011.01)
*H04N 7/167* (2011.01)
*H04N 5/765* (2006.01)
*G06F 12/00* (2006.01)
*G06F 7/04* (2006.01)
*G06F 21/00* (2006.01)
*H04L 9/32* (2006.01)

(52) U.S. Cl. ............. 719/321; 725/5; 725/25; 710/200; 726/26; 713/168; 705/51; 380/201; 386/200

(58) Field of Classification Search ................ 725/5, 25; 719/321; 710/200; 726/26; 713/168; 705/51; 380/201; 386/200
See application file for complete search history.

(56) References Cited

U.S. PATENT DOCUMENTS

| | | | |
|---|---|---|---|
| 6,697,944 B1 * | 2/2004 | Jones et al. | 713/168 |
| 6,986,030 B2 * | 1/2006 | Shmueli et al. | 713/1 |
| 7,073,058 B2 * | 7/2006 | Lee | 713/168 |
| 2002/0062259 A1 | 5/2002 | Katz et al. | |
| 2004/0123103 A1 | 6/2004 | Risan et al. | |
| 2004/0186993 A1 | 9/2004 | Risan et al. | |
| 2004/0236945 A1 | 11/2004 | Risan et al. | |
| 2005/0060542 A1 | 3/2005 | Risan et al. | |
| 2005/0078944 A1 | 4/2005 | Risan et al. | |
| 2005/0169467 A1 | 8/2005 | Risan et al. | |
| 2005/0172121 A1 | 8/2005 | Risan et al. | |
| 2006/0021057 A1 | 1/2006 | Risan et al. | |
| 2006/0064583 A1 | 3/2006 | Birnbaum et al. | |
| 2006/0277598 A1 * | 12/2006 | Ahn | 726/5 |
| 2007/0083907 A1 * | 4/2007 | Serbest et al. | 725/112 |
| 2007/0239608 A1 * | 10/2007 | Elbring | 705/51 |
| 2008/0028417 A1 * | 1/2008 | Edson | 719/321 |

FOREIGN PATENT DOCUMENTS

JP    2006-202234    *    8/2006

* cited by examiner

*Primary Examiner* — Hoang-Vu A Nguyen-Ba
(74) *Attorney, Agent, or Firm* — Toler Law Group

(57) ABSTRACT

The present disclosure is directed to a system and method of multimedia access. In an embodiment, an authorization signal can be received from a multimedia distribution system at a multimedia receiver having a peripheral device interface. The authorization signal can authorize data transfer via the peripheral device interface.

25 Claims, 5 Drawing Sheets

SYSTEM AND METHOD FOR PROVIDING ACCESS TO MULTIMEDIA CONTENT VIA A SERIAL CONNECTION

FIELD OF THE DISCLOSURE

The present disclosure relates to providing access to multimedia content.

BACKGROUND

Portable consumer electronics are becoming increasingly popular. Various devices can store and retrieve multimedia content such as songs, movies, television programs, or electronic games. However, it can be difficult to locate sources of multimedia content providing secure and reliable access to a broad selection of available content. In addition, ease of communication between electronic devices presents difficulties for content providers desiring to limit transfer or copying of the multimedia content once provided. Hence, there is a need for an improved system and method of multimedia access.

DETAILED DESCRIPTION OF THE DRAWINGS

In a particular embodiment, a multimedia receiver is disclosed that includes a peripheral device interface and a device driver selectively inaccessible to the peripheral device interface. The multimedia receiver also includes a memory device accessible to a processor. The memory device includes instructions executable by the processor to enable data transfer via the peripheral device interface when an authorization is received via a multimedia distribution network and to make the device driver accessible to the peripheral device interface after the authorization is received.

In another embodiment, a multimedia access method is disclosed. The method includes receiving an authorization from a multimedia distribution system at a multimedia receiver having a Universal Serial Bus (USB) port. The authorization authorizes data transfer via the USB port. The method also includes transferring data via the USB port.

In another embodiment, a second multimedia access method is disclosed. The method includes receiving information required to enable data transfer via a serial port of a multimedia receiver at a server of a multimedia distribution system. The method also includes sending an authorization to the multimedia receiver to authorize data transfer between the multimedia receiver and at least one peripheral device via the serial port.

In another embodiment, a processor-readable medium is disclosed. The medium tangibly embodies processor instructions to identify a peripheral device coupled to a serial interface and to send data to a display device indicating that the peripheral device is not authorized to receive multimedia content via the serial interface.

Figure 1:
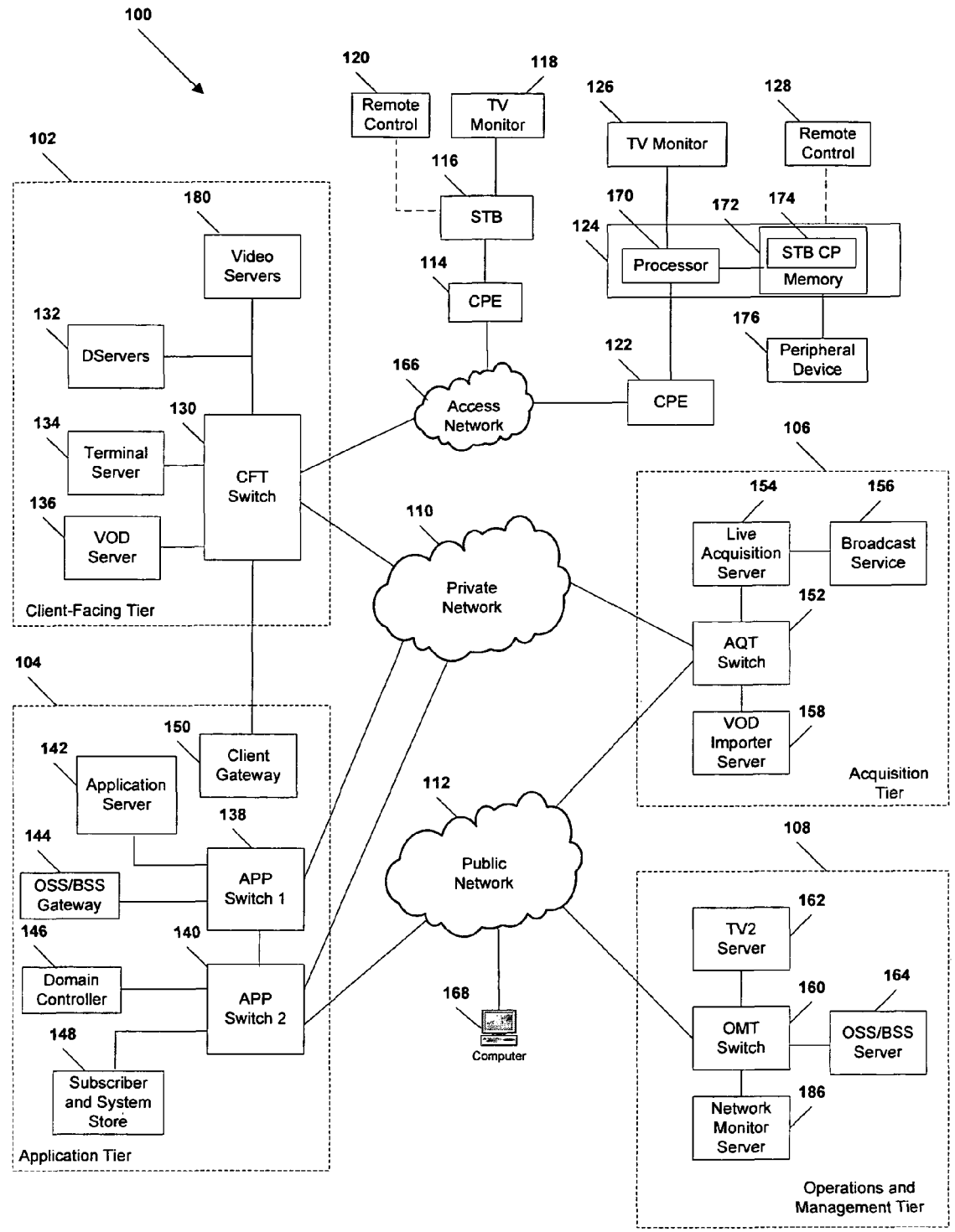
FIG. 1 is a block diagram of a particular illustrative embodiment of an Internet Protocol Television (IPTV) system.

Referring to FIG. 1, an illustrative embodiment of an Internet Protocol Television (IPTV) system that may be used to provide a set-top box application is illustrated and is generally designated 100. As shown, the system 100 can include a client facing tier 102, an application tier 104, an acquisition tier 106, and an operations and management tier 108. Each tier 102, 104, 106, 108 is coupled to a private network 110; to a public network 112, such as the Internet; or to both the private network 110 and the public network 112. For example, the client-facing tier 102 can be coupled to the private network 110. Further, the application tier 104 can be coupled to the private network 110 and to the public network 112. The acquisition tier 106 can also be coupled to the private network 110 and to the public network 112. Additionally, the operations and management tier 108 can be coupled to the public network 112.

As illustrated in FIG. 1, the various tiers 102, 104, 106, 108 communicate with each other via the private network 110 and the public network 112. For instance, the client-facing tier 102 can communicate with the application tier 104 and the acquisition tier 106 via the private network 110. The application tier 104 can communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104, including, but not limited to, a client gateway 150, can communicate directly with the client-facing tier 102.

The client-facing tier 102 can communicate with user equipment via an access network 166, such as an Internet Protocol Television (IPTV) access network. In an illustrative embodiment, customer premises equipment (CPE) 114, 122 can be coupled to a local switch, router, or other device of the access network 166. The client-facing tier 102 can communicate with a first representative set-top box device 116 via the first CPE 114 and with a second representative set-top box device 124 via the second CPE 122. In a particular embodiment, the first representative set-top box device 116 and the first CPE 114 can be located at a first customer premise, and the second representative set-top box device 124 and the second CPE 122 can be located at a second customer premise. In another particular embodiment, the first representative set-top box device 116 and the second representative set-top box device 124 can be located at a single customer premise, both coupled to one of the CPE 114, 122. The CPE 114, 122 can include routers, local area network devices, modems, such as digital subscriber line (DSL) modems, any other suitable devices for facilitating communication between a set-top box device and the access network 166, or any combination thereof.

In an exemplary embodiment, the client-facing tier 102 can be coupled to the CPE 114, 122 via fiber optic cables. In another exemplary embodiment, the CPE 114, 122 can be digital subscriber line (DSL) modems that are coupled to one or more network nodes via twisted pairs, and the client-facing tier 102 can be coupled to the network nodes via fiber-optic cables. Each set-top box device 116, 124 can process data received via the access network 166, via an IPTV software platform, such as Microsoft® TV IPTV Edition.

The first set-top box device 116 can be coupled to a first external display device, such as a first television monitor 118, and the second set-top box device 124 can be coupled to a second external display device, such as a second television monitor 126. Moreover, the first set-top box device 116 can communicate with a first remote control 120, and the second set-top box device 124 can communicate with a second remote control 128. The set-top box devices 116, 124 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 116, 124 can receive data, video, or any combination thereof, from the client-facing tier 102 via the access network 166 and render or display the data, video, or any combination thereof, at the display device 118, 126 to which it is coupled. In an illustrative embodiment, the set-top box devices 116, 124 can include tuners that receive and decode television programming signals or packet streams for transmission to the display devices 118, 126. Further, the set-top box devices 116, 124 can include a STB processor 170 and a STB memory device 172 that is accessible to the STB processor 170. In one embodiment, a computer program, such as the STB computer program 174, can be embedded within the STB memory device 172.

In an illustrative embodiment, the client-facing tier 102 can include a client-facing tier (CFT) switch 130 that manages communication between the client-facing tier 102 and the access network 166 and between the client-facing tier 102 and the private network 110. As illustrated, the CFT switch 130 is coupled to one or more data servers, such as D-servers 132, that store, format, encode, replicate, or otherwise manipulate or prepare video content for communication from the client-facing tier 102 to the set-top box devices 116, 124. The CFT switch 130 can also be coupled to a terminal server 134 that provides terminal devices with a connection point to the private network 110. In a particular embodiment, the CFT switch 130 can be coupled to a video-on-demand (VOD) server 136 that stores or provides VOD content imported by the IPTV system 100. Further, the CFT switch 130 is coupled to one or more video servers 180 that receive video content and transmit the content to the set-top boxes 116, 124 via the access network 166.

In an illustrative embodiment, the client-facing tier 102 can communicate with a large number of set-top boxes, such as the representative set-top boxes 116, 124 over a wide geographic area, such as a metropolitan area, a viewing area, a statewide area, a regional area, a nationwide area or any other suitable geographic area, market area, or subscriber or customer group that can be supported by networking the client-facing tier 102 to numerous set-top box devices. In a particular embodiment, the CFT switch 130, or any portion thereof, can include a multicast router or switch that communicates with multiple set-top box devices via a multicast-enabled network.

As illustrated in FIG. 1, the application tier 104 can communicate with both the private network 110 and the public network 112. The application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. In a particular embodiment, the application server 142 can provide applications to the set-top box devices 116, 124 via the access network 166, which enable the set-top box devices 116, 124 to provide functions, such as interactive program guides, video gaming, display, messaging, processing of VOD material and other IPTV content, etc. In an illustrative embodiment, the application server 142 can provide location information to the set-top box devices 116, 124. In a particular embodiment, the OSS/BSS gateway 144 includes operation systems and support (OSS) data, as well as billing systems and support (BSS) data. In one embodiment, the OSS/BSS gateway 144 can provide or restrict access to an OSS/BSS server 164 that stores operations and billing systems data.

The second APP switch 140 can be coupled to a domain controller 146 that provides Internet access, for example, to users at their computers 168 via the public network 112. For example, the domain controller 146 can provide remote Internet access to IPTV account information, e-mail, personalized Internet services, or other online services via the public network 112. In addition, the second APP switch 140 can be coupled to a subscriber and system store 148 that includes account information, such as account information that is associated with users who access the IPTV system 100 via the private network 110 or the public network 112. In an illustrative embodiment, the subscriber and system store 148 can store subscriber or customer data and create subscriber or customer profiles that are associated with IP addresses, stock-keeping unit (SKU) numbers, other identifiers, or any combination thereof, of corresponding set-top box devices 116, 124. In another illustrative embodiment, the subscriber and system store can store data associated with capabilities of set-top box devices associated with particular customers.

In a particular embodiment, the application tier 104 can include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto. In an illustrative embodiment, the set-top box devices 116, 124 can access the IPTV system 100 via the access network 166, using information received from the client gateway 150. User devices can access the client gateway 150 via the access network 166, and the client gateway 150 can allow such devices to access the private network 110 once the devices are authenticated or verified. Similarly, the client gateway 150 can prevent unauthorized devices, such as hacker computers or stolen set-top box devices from accessing the private network 110, by denying access to these devices beyond the access network 166.

For example, when the first representative set-top box device 116 accesses the client-facing tier 102 via the access network 166, the client gateway 150 can verify subscriber information by communicating with the subscriber and system store 148 via the private network 110. Further, the client gateway 150 can verify billing information and status by communicating with the OSS/BSS gateway 144 via the private network 110. In one embodiment, the OSS/BSS gateway 144 can transmit a query via the public network 112 to the OSS/BSS server 164. After the client gateway 150 confirms subscriber and/or billing information, the client gateway 150 can allow the set-top box device 116 to access IPTV content and VOD content at the client-facing tier 102. If the client gateway 150 cannot verify subscriber information for the set-top box device 116, e.g., because it is connected to an unauthorized twisted pair, the client gateway 150 can block transmissions to and from the set-top box device 116 beyond the access network 166.

As indicated in FIG. 1, the acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives or acquires television content, movie content, advertisement content, other video content, or any combination thereof, from a broadcast service 156, such as a satellite acquisition system or satellite head-end office. In a particular embodiment, the live acquisition server 154 can transmit content to the AQT switch 152, and the AQT switch 152 can transmit the content to the CFT switch 130 via the private network 110.

In an illustrative embodiment, content can be transmitted to the D-servers 132, where it can be encoded, formatted, stored, replicated, or otherwise manipulated and prepared for communication from the video server(s) 180 to the set-top box devices 116, 124. The CFT switch 130 can receive content from the video server(s) 180 and communicate the content to the CPE 114, 122 via the access network 166. The set-top box devices 116, 124 can receive the content via the CPE 114, 122, and can transmit the content to the television monitors 118, 126. In an illustrative embodiment, video or audio portions of the content can be streamed to the set-top box devices 116, 124.

Further, the AQT switch 152 can be coupled to a video-on-demand importer server 158 that receives and stores television or movie content received at the acquisition tier 106 and communicates the stored content to the VOD server 136 at the client-facing tier 102 via the private network 110. Additionally, at the acquisition tier 106, the video-on-demand (VOD) importer server 158 can receive content from one or more VOD sources outside the IPTV system 100, such as movie studios and programmers of non-live content. The VOD importer server 158 can transmit the VOD content to the AQT switch 152, and the AQT switch 152, in turn, can communicate the material to the CFT switch 130 via the private network 110. The VOD content can be stored at one or more servers, such as the VOD server 136.

When users issue requests for VOD content via the set-top box devices 116, 124, the requests can be transmitted over the access network 166 to the VOD server 136, via the CFT switch 130. Upon receiving such requests, the VOD server 136 can retrieve the requested VOD content and transmit the content to the set-top box devices 116,124 across the access network 166, via the CFT switch 130. The set-top box devices 116, 124 can transmit the VOD content to the television monitors 118, 126. In an illustrative embodiment, video or audio portions of VOD content can be streamed to the set-top box devices 116, 124.

FIG. 1 further illustrates that the operations and management tier 108 can include an operations and management tier (OMT) switch 160 that conducts communication between the operations and management tier 108 and the public network 112. In the embodiment illustrated by FIG. 1, the OMT switch 160 is coupled to a TV2 server 162. Additionally, the OMT switch 160 can be coupled to an OSS/BSS server 164 and to a network monitor 186, such as a simple network management protocol (SNMP) monitor or a like protocol, that monitors network devices within or coupled to the IPTV system 100. In a particular embodiment, the OMT switch 160 can communicate with the AQT switch 152 via the public network 112.

In an illustrative embodiment, the live acquisition server 154 can transmit content to the AQT switch 152, and the AQT switch 152, in turn, can transmit the content to the OMT switch 160 via the public network 112. In this embodiment, the OMT switch 160 can transmit the content to the TV2 server 162 for display to users accessing the user interface at the TV2 server 162. For example, a user can access the TV2 server 162 using a personal computer 168 coupled to the public network 112.

In an illustrative embodiment, an external device such as a peripheral device 176, e.g., a portable multimedia player, a gaming system, a memory device, etc., can be coupled to a set-top box device, such as the second representative set-top box device 124, for example, via a universal serial bus (USB) connection or other connection. In an illustrative embodiment, one or more device drivers that enable the set-top box device 124 to exchange data with the peripheral device 176 can be provided to the set-top box device 124 by the terminal server 134. In another illustrative embodiment, the device drivers can be provided to the set-top box device 124 by the application server 142.

Figure 2:
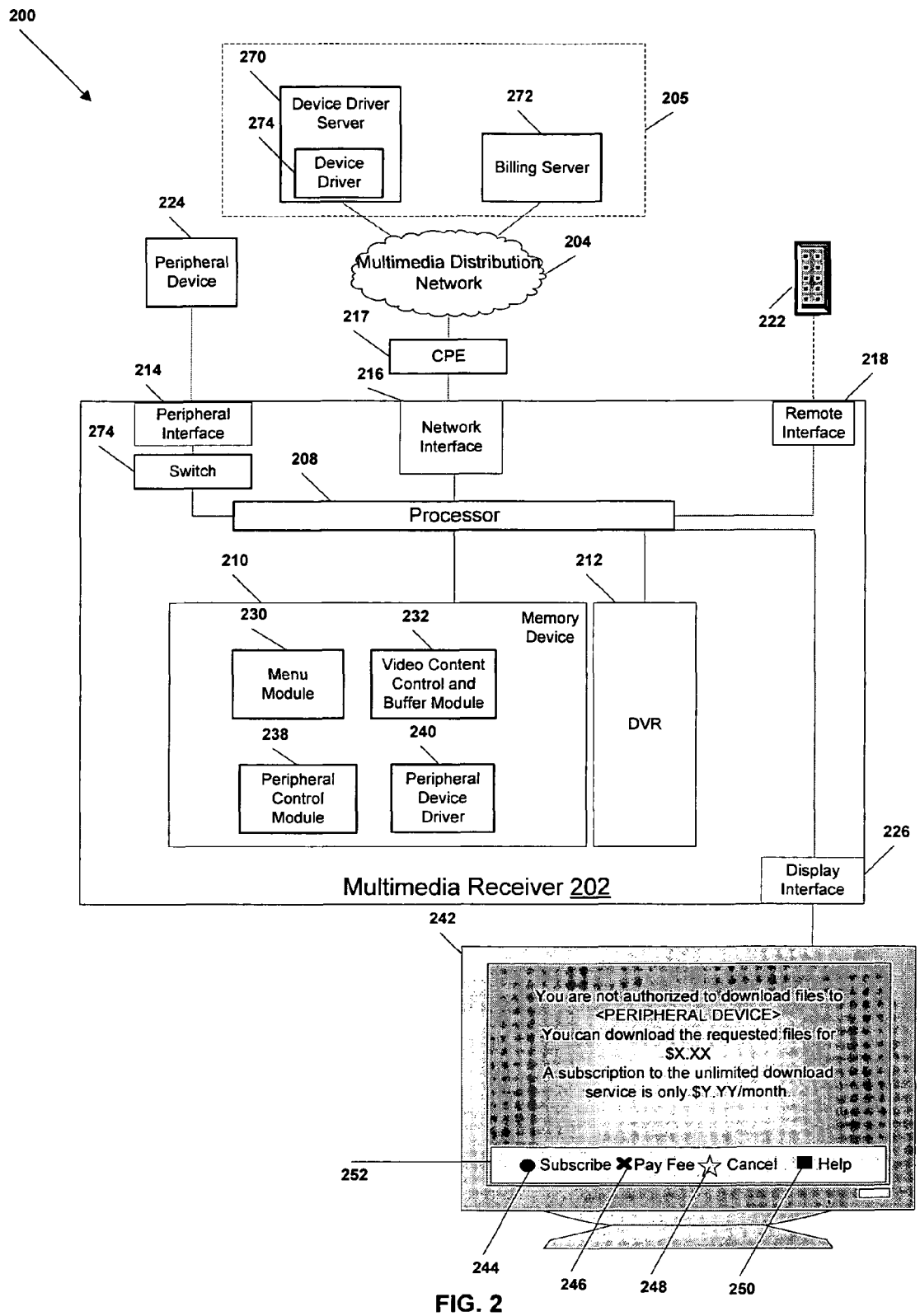
FIG. 2 is a block diagram of a particular illustrative embodiment of a system to provide multimedia access.

Referring to FIG. 2, a particular illustrative embodiment of a system to provide multimedia access is depicted and generally designated 200. A multimedia receiver 202, such as a set-top box device, communicates with a multimedia distribution system 205 that includes a device driver server 270 and a billing server 272 via a multimedia distribution network 204. The multimedia receiver 202 can further communicate with a remote control 222, a display device 242, and a peripheral device 224.

In a particular embodiment, the multimedia receiver 202 includes a processor 208 coupled to a memory device 210. In an illustrative embodiment, the processor 208 can be coupled to a digital video recorder (DVR) 212. Further, the processor 208 can be coupled to a network interface 216 to communicate with the multimedia distribution system 205 via the multimedia distribution network 204 and customer premises equipment (CPE) 217. In addition, the processor 208 can be coupled to a remote interface 218 that allows the multimedia receiver 202 to receive commands from the remote control 222. Additionally, the processor 208 can be coupled to a display interface 226 that allows the multimedia receiver 202 to display multimedia content at the display device 242.

The memory device 210 can include a video content control and buffer module 232 to buffer multimedia content received from the multimedia distribution system 205 via the network interface 216.

In a particular embodiment, the memory device 210 can include a menu module 230 executable by the processor 208 to display notices and selectable menus at the display device 242. The menu module 230 can also be executable by the processor 208 to process menu navigation and selection commands received at the multimedia receiver 202. In an illustrative embodiment, menu navigation and selection commands can be received from the remote control device 222 via the remote interface 218, from a voice interface (not shown), from other navigation and selection systems (not shown), or from any combination thereof.

In a particular embodiment, the memory device 210 can also include a peripheral control module 238 executable by the processor 208 to control data transfer with one or more peripheral devices 224 via a peripheral device interface 214. In an illustrative embodiment, the peripheral control module 238 can be executable by the processor 208 to control communication between the peripheral device 224 and the DVR 212, the memory device 210, other memory devices such as an external storage device (not shown), or any combination thereof.

In a particular illustrative embodiment, the peripheral device 224 can include a portable video player, and the peripheral control module 238 can be executable by the processor 208 to control the download of television programs or movies stored at the DVR 212 to the peripheral device 224. In another particular illustrative embodiment, the peripheral device 224 can include a video camera or MP3 player, and the peripheral control module 238 can be executable by the processor 208 to control the upload of video or music data to the DVR 212. In a particular illustrative embodiment, the peripheral control module 238 can be executable by the processor 208 to control the transfer of data to the peripheral device 224 including audio content, video content, electronic book content, Voice-over-Internet Protocol (VoIP) content, other multimedia content, or any combination thereof.

In a particular embodiment, the peripheral device 224 can include a processor (not shown), and the peripheral control module 238 can transfer processor-executable data to the peripheral device 224. In a particular illustrative embodiment, the peripheral device 224 can be a gaming device, and the peripheral control module 238 can control the transfer of gaming content and related data between the peripheral device 224 and the multimedia distribution system. For example, the peripheral control module 238 can control the transfer of gaming applications to the peripheral device 224 from the multimedia distribution system. As another example, the peripheral control module 238 can control the transfer of gaming data, such as game status information, to the multimedia distribution system. In a particular illustrative embodiment, the multimedia distribution system 205 can be the Internet Protocol Television (IPTV) system 100 of FIG. 1, and gaming application content can be provided via the terminal server 134, the application server 142, a gaming application server (not shown), or any combination thereof.

In a particular embodiment, communication with the peripheral device 224 can be enabled via a peripheral interface 214. In an illustrative embodiment, the peripheral interface 214 can include a universal serial bus (USB) port that facilitates data communication via a USB High Speed or other designation or standard, such as USB 1.1, USB 1.2, USB 2.0, Wireless USB, USB On-The-Go, any other USB protocol, standard, technology, or any combination thereof. In a particular illustrative embodiment, the peripheral interface 214 can enable communication via one or more other communication protocols, technologies, or standards.

Data transfer via the peripheral interface 214 can be restricted to authorized transfers in accordance with a subscription or other agreement between a user of the multimedia receiver 202 and the multimedia distribution system. In a particular embodiment, data transfer via the peripheral interface 214 can be disabled until an indication of authorization is received from the multimedia distribution system. When authorization is received, the peripheral control module 238 can enable data transfer with the peripheral device 224. In an illustrative embodiment, one or more peripheral devices 224 can be identified when coupled to the peripheral device interface 214 and one or more device drivers 240 can be identified to enable communication with the peripheral devices 224 via the peripheral device interface 214.

In a particular illustrative embodiment, communication via the peripheral interface 214 can be controlled by a switch 274. The switch 274 can enable or disable uni-directional or bi-directional data transfer between the peripheral device 224 and the multimedia receiver 202. In an illustrative embodiment, the switch 274 can selectively enable data transfer exclusively between the peripheral device 224 and the processor 208, the memory device 210, the DVR 212, the multimedia distribution network 204 via the network interface 216, or any combination thereof. The switch 274 can comprise hardware, software, firmware, or any combination thereof.

In a particular embodiment, the peripheral control module 238 can be executable by the processor 208 to identify a peripheral device 224 coupled to the peripheral device interface 214 and to transfer data to the peripheral device 224 when the peripheral device 224 is an authorized device, and to not transfer data to the peripheral device 224 when the peripheral device 224 is not an authorized device. In an illustrative embodiment, the memory device 210 can include a peripheral device driver 240 that is selectively inaccessible to the peripheral device interface 214, so that data transfer with the peripheral device 224 via the peripheral interface 214 is reduced or prevented. In a particular illustrative embodiment, the peripheral control module 238 can disable one or more modes of communication with a non-authorized peripheral device 224 via the switch 274, selective access to the peripheral device drivers 240, selective retrieval or storage of peripheral device drivers 240 from the multimedia distribution system, control of data transfer generally via logic executed by the processor 208, or any combination thereof.

When an authorization allowing communication with the peripheral device 224 is received, the peripheral control module 238 can allow or provide access to the device driver 240. In a particular embodiment, the authorization can be received via the multimedia distribution network 204 and indicate at least one peripheral device 224 that is authorized to transfer data via the peripheral interface 214. In a particular illustrative embodiment, the peripheral device driver 240 can be a custom or unique device driver having a limited use to only a particular type of peripheral device 224, a predetermined subset of peripheral devices 224, or a single peripheral device 224. For example, a unique or pseudo-unique identifier, such as a Media Access Control (MAC) address, can be used in conjunction with the peripheral device driver 240 to limit communication via the peripheral interface 214 to a particular peripheral device 224. In another illustrative embodiment, the peripheral device driver 240 can be encrypted, and thus rendered unusable, until an encryption key is received from the multimedia distribution system 205 to allow decryption of the device driver 240.

In a particular embodiment, the menu module 230 can be executable by the processor 208 to send a selectable menu 252 to the display device 242, such as when the peripheral device 224 is not an authorized device, or when an unauthorized data transfer is requested by a user of the multimedia receiver 202. The menu module 230 can be executable by the processor 208 to provide a notice to a user of the display device 242 indicating, for example, that the peripheral device 224 is not authorized to communicate data with the multimedia receiver 202, or that the requested data transfer is not authorized. For example, the menu module 230 can provide a notice when an unauthorized peripheral device 224 is first coupled to the peripheral interface 214, or when a user of the multimedia receiver 202 requests an unauthorized transfer of data to or from the peripheral device 224.

In a particular illustrative embodiment, the selectable menu 252 can include an option 244 to subscribe to a service allowing data transfer with the peripheral device 224, an option 246 to accept a fee for the data transfer, an option 248 to cancel a requested data transfer, and an option 250 to request additional information. The menu module 230 can receive a selection of a menu option 244, 246, 248, 250 of the selectable menu 252, such as via a signal received at the multimedia device 202 from the remote control device 222, a control panel of the multimedia receiver (not shown), a speech recognition interface (not shown), any other navigation or selection mechanism, or any combination thereof.

In a particular embodiment, when a menu option 244, 246 indicating acceptance of a fee or subscription to a service is selected by a user of the multimedia receiver 202, the peripheral control module 238 can send a signal indicating the acceptance to a server of the multimedia distribution system, such as the billing server 272. In a particular illustrative embodiment, the peripheral control module 238 can also provide a signal to the billing server 272 indicating the selection of the menu option 244, 246 and identifying the peripheral device 224. In an illustrative embodiment where the multimedia distribution system 205 is the IPTV system 100 of FIG. 1, the multimedia receiver 202 can send and receive data relating to the selectable menu 252 and multimedia content transfer via the peripheral interface 214 with the OSS/BSS server 164, the terminal server 134, the application server 142, or any combination thereof.

In a particular embodiment, after the peripheral control module 238 has sent a signal to a first server of the multimedia distribution network, such as the billing server 272, that indicates an acceptance of a fee, a subscription to a service, another option that authorizes data transfer with the peripheral device 224, or any combination thereof, the peripheral control module 238 can receive a signal from the multimedia distribution system 205 enabling multimedia file access via the peripheral interface 214. In a particular illustrative embodiment, the peripheral control module 238 can receive an authorization of a particular type of data transfer via the peripheral interface 214, such as, for example, only uploading data, only downloading data, only allowing data transfer with the DVR 212, only allowing data transfer via the network interface, only allowing any other particular type of data transfer, or any combination thereof. In another particular illustrative embodiment, the peripheral control module 238 can receive one or more data transfer limits, such as a one-time, daily, or monthly limit, and can track an amount of data transferred via the peripheral interface 214 to detect or enforce compliance with the data transfer limits.

In another particular illustrative embodiment, the peripheral control module 238 can receive one or more device drivers 274 from a second server of the multimedia distribution system, such as the device driver server 270, that enable multimedia file access via the peripheral interface 214. The device driver(s) 274 can be accessible to the peripheral interface 214 to allow data transfer to the peripheral device 224, such as a generic or custom driver for communicating via a USB port, as non-limiting, illustrative examples. In a particular illustrative embodiment where the multimedia distribution system 205 is the IPTV system 100 of FIG. 1, the device driver(s) 274 can be sent to the multimedia receiver 202 from the terminal server 134, the application server 142, a device driver server (not shown), or any combination thereof.

Figure 3:
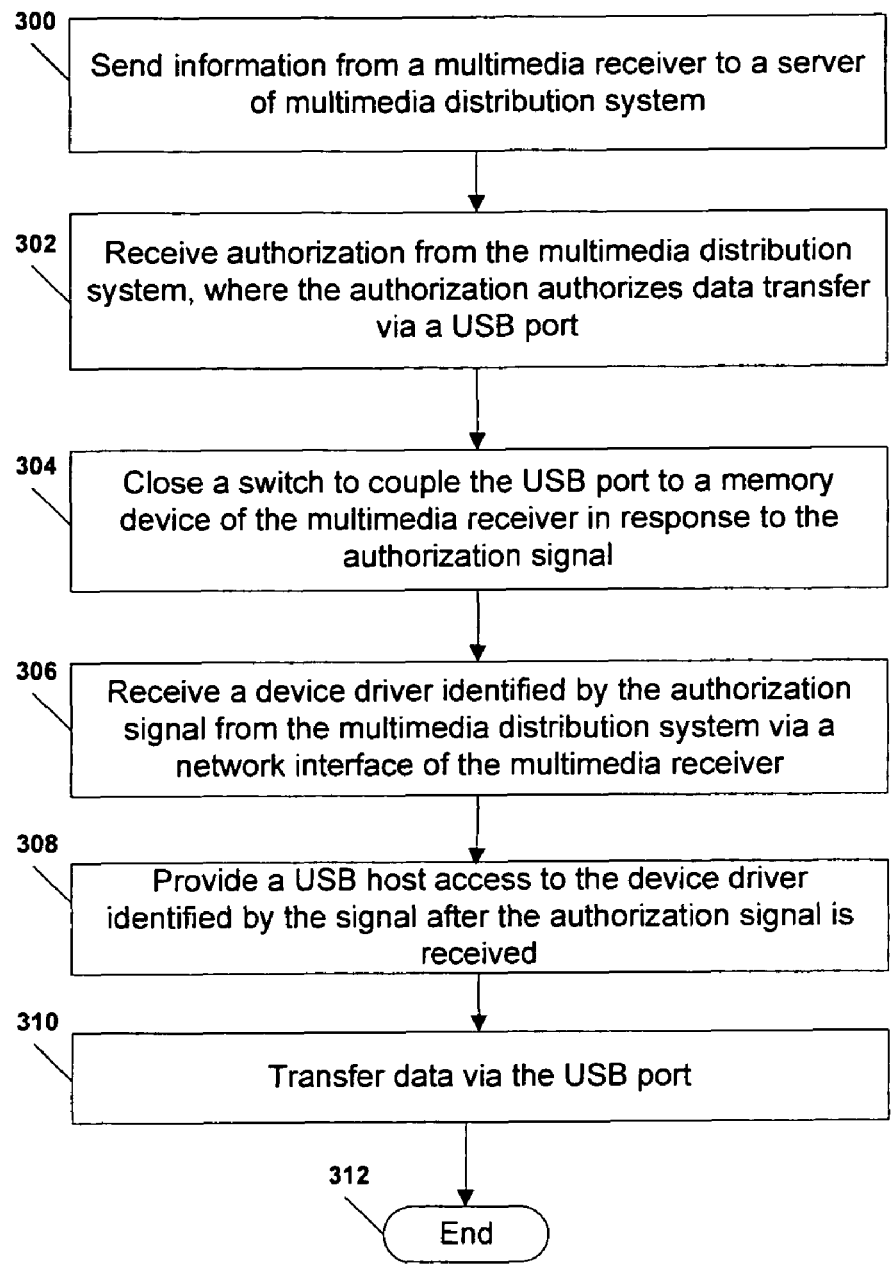
FIG. 3 is a flow diagram of a particular illustrative embodiment of a method of providing multimedia access.

With reference to FIG. 3, a flow diagram of a particular illustrative embodiment of a method of providing multimedia access is depicted. At block 300, in a particular embodiment, a multimedia receiver having a USB port sends information to a server of a multimedia distribution system. In an illustrative embodiment, the information can indicate an acceptance of a condition such as a fee or subscription related to a service to allow data transfer between a set-top box a and a peripheral device. Moving to block 302, an authorization is received from the multimedia distribution system at the multimedia receiver, where the authorization authorizes data transfer via the USB port. In a particular embodiment, the authorization can include an electrical signal, an optical signal, a magnetic signal, any other type of signal, or any combination thereof. In a particular embodiment, the authorization can include data that can be interpreted or operated on by the multimedia receiver to authorize or enable data transfer via the USB port. In an illustrative example, the authorization can be received as Internet Protocol (IP) packet data via an IP network Continuing to block 304, in a particular embodiment, a switch is closed to couple the USB port to a memory device of the multimedia receiver in response to the authorization. In an illustrative embodiment, the switch can be a physical switch, logical switch, software control switch, or any combination thereof. Progressing to block 306, in a particular embodiment, a device driver identified by the authorization can be received via a network interface of the multimedia receiver.

Moving to block 308, in a particular embodiment, a USB host is provided access to the device driver identified by the authorization signal after the signal is received. Continuing to block 310, data is transferred via the USB port. The method terminates at 312.

Figure 4:
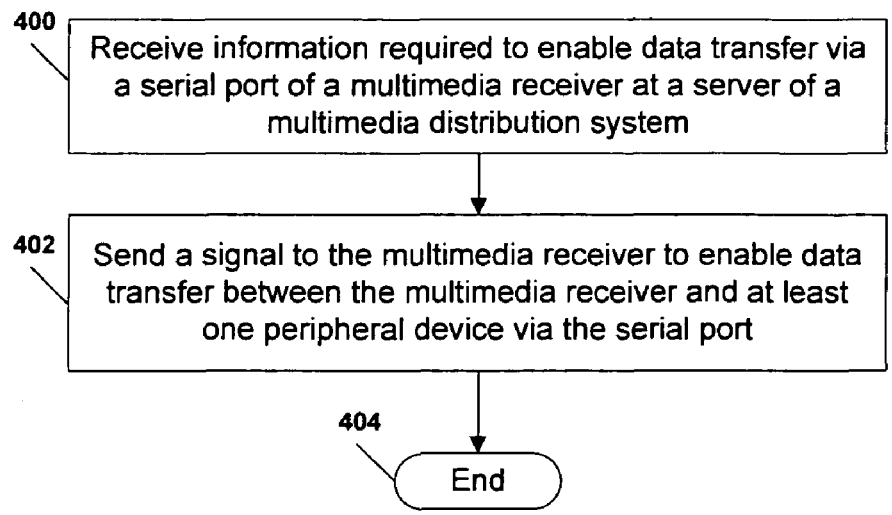
FIG. 4 is a flow diagram of a second particular illustrative embodiment of a method of providing multimedia access.

With reference to FIG. 4, a flow diagram of another particular illustrative embodiment of a method of providing multimedia access is depicted. At block 400, a server of a multimedia distribution system receives information required to enable data transfer via a serial port of a multimedia receiver. In an illustrative embodiment, the server can be the OSS/BSS server 164 of the internet protocol television (IPTV) system 100 of FIG. 1, and the required information can include an acceptance of one or more conditions such as paying a fee, subscribing to service, user identification information, payment information, peripheral device identification, type of transfer service, or any combination thereof. Progressing to block 402, a signal is sent to the multimedia receiver to enable data transfer between the multimedia receiver and at least one peripheral device via the serial port. In an illustrative embodiment, the signal can provide authorization for the data transfer, data required to enable the transfer, other information, or any combination thereof. The method terminates at 404.

In conjunction with the configuration of structure described herein, the systems and methods disclosed can enable a multimedia receiver, such as a set-top box, to detect a peripheral device coupled to a peripheral interface, such as a USB port. The multimedia receiver can determine if the peripheral device is authorized to transfer data to or from the multimedia receiver. If a user of the multimedia receiver requests a data transfer that is not authorized, such as, for example, downloading a television program stored at a DVR of the multimedia receiver to a personal video device, a notice can be displayed on a display device indicating a refusal to complete the requested data transfer. A selectable menu can also be displayed, including available options for the user, such as a paying for a one-time transfer, subscribing to a service, canceling the request, receiving more information, any other available option, or any combination thereof.

Upon receiving a selection of an option indicating a request to complete the data transfer, the multimedia receiver can send information indicating the selection, the peripheral device, other pertinent or required information, or any combination thereof, to one or more servers of a multimedia distribution system such as an IPTV system, including an OSS/BSS server, a terminal server, an application server, or any combination thereof. After receiving the information from the multimedia receiver and updating applicable records and settings, an authorization signal can be sent from a server of an IPTV system, such as an OSS/BSS server, to the multimedia receiver to enable data transfer via the peripheral device. The signal can include an authorization code or parameter, a device driver, or a decryption key, as illustrative, non-limiting examples. After receiving the authorization signal, data transfer can be enabled via the peripheral interface.

Figure 5:
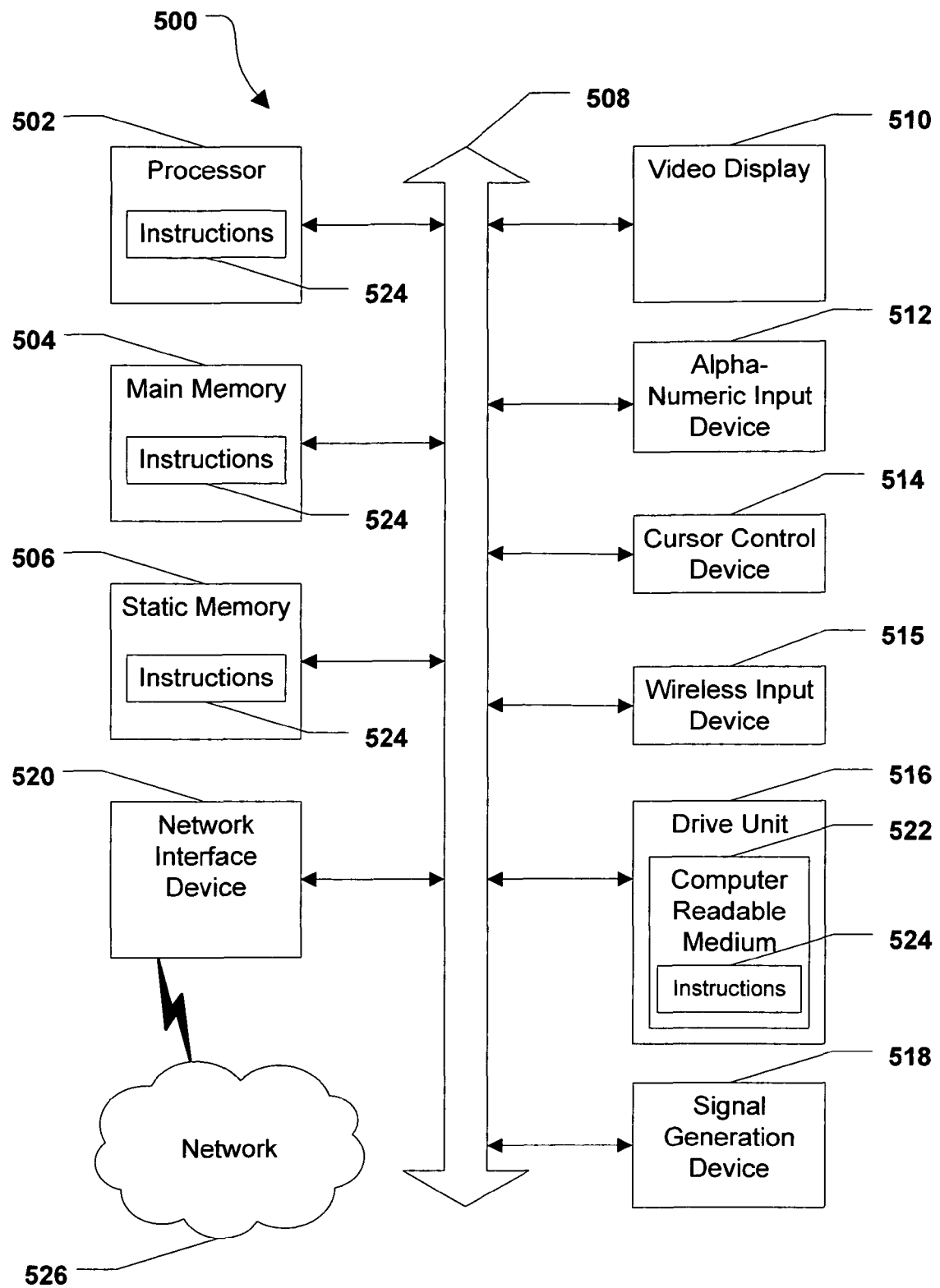
FIG. 5 is a diagram of an embodiment of a general computer system.

Referring to FIG. 5, an illustrative embodiment of a general computer system is shown and is designated 500. The computer system 500 can include a set of instructions that can be executed to cause the computer system 500 to perform any one or more of the methods or computer based functions disclosed herein. The computer system 500, or any portion thereof, may operate as a standalone device or may be connected, e.g., using a public network, such as the Internet, or a private network, to other computer systems or peripheral devices, including but not limited to servers, customer premises equipment, and multimedia receivers, as depicted in FIGS. 1-2.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510, such as a liquid crystal display (LCD), an organic light emitting diode (OLED), a flat panel display, a solid state display, or a cathode ray tube (CRT). Additionally, the computer system 500 may include an input device 512, such as a keyboard, and a cursor control device 514, such as a mouse. Further, the computer system 500 can include a wireless input device 515, e.g., a remote control device. When the computer system 500, or any portion thereof, is embodied in a set-top box device, the cursor control device 514 can be a remote control device. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal, so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A multimedia access method, comprising:
receiving an authorization from a multimedia distribution system of a multimedia distribution network at a multimedia receiver having a universal serial bus interface, wherein the authorization includes authorization data identifying a peripheral device that is authorized to transfer content data via the universal serial bus interface;
in response to receiving the authorization at the multimedia receiver, providing the universal serial bus interface with access to a selectively inaccessible peripheral device driver that is associated with the peripheral device that is authorized to transfer the content data via the universal serial bus interface;
receiving, at the multimedia receiver, a request to transfer the content data between a particular peripheral device and the multimedia receiver via the universal serial bus interface;
determining, based on the authorization data, whether the particular peripheral device is authorized to transfer the content data via the universal serial bus interface; and
transferring the content data via the universal serial bus interface when the particular peripheral device is authorized to transfer the content data via the universal serial bus interface.

2. The method of claim 1, wherein the authorization that includes the authorization data that identifies the peripheral device that is authorized to transfer the content data via the universal serial bus interface is received via a private access network of an internet protocol television system.

3. The method of claim 1, further comprising:
closing a switch to couple the universal serial bus interface to a memory device of the multimedia receiver in response to receiving the authorization.

4. The method of claim 1, further comprising receiving the selectively inaccessible peripheral device driver associated with the peripheral device that is authorized to transfer content data via the universal serial bus interface from the multimedia distribution system of the multimedia distribution network via a network interface of the multimedia receiver.

5. The method of claim 1, further comprising sending information to a server of an internet protocol television system before receiving the authorization.

6. The method of claim 5, wherein the server is a billing server and the information includes payment information.

7. The multimedia access method of claim 1, further comprising receiving the selectively inaccessible peripheral device driver from the multimedia distribution system of the multimedia distribution network.

8. The multimedia access method of claim 7, wherein the multimedia receiver includes a set-top box device, wherein the multimedia distribution network includes a private access network of an internet protocol television system, and wherein the multimedia distribution system includes a terminal server of the internet protocol television system.

9. The multimedia access method of claim 7, wherein the multimedia receiver includes a set-top box device, wherein the multimedia distribution network includes a private access network of an internet protocol television system, and wherein the multimedia distribution system includes an application server of the internet protocol television system.

10. The multimedia access method of claim 1 wherein the authorization data identifies a second peripheral device that is authorized to transfer the content data via the univeral serial bus interface, and wherein the univeral serial bus interface is provided with access to a second selectively inaccessible peripheral device driver that is associated with the second peripheral device that is authorized to transfer the content data via the univeral serial bus interface in response to receiving the authorization at the multimedia receiver.

11. The multimedia access method of claim 1, wherein the content data is transferred from the multimedia receiver to the particular peripheral device via the univeral serial bus interface when the particular peripheral device is authorized to transfer the content data via the univeral serial bus interface.

12. The multimedia access method of claim 1, wherein the content data is transferred to the multimedia receiver from the particular peripheral device via the univeral serial bus interface when the particular peripheral device is authorized to transfer the content data via the univeral serial bus interface.

13. The multimedia access method of claim 1, wherein the selectively inaccessible peripheral device driver is associated with a particular type of peripheral device.

14. The multimedia access method of claim 1, wherein the selectively inaccessible peripheral device driver is associated with a plurality of peripheral devices.

15. The multimedia access method of claim 1, wherein the selectively inaccessible peripheral device driver is associated with a single peripheral device.

16. The multimedia access method of claim 15, wherein the selectively inaccessible peripheral device driver is associated with a media access control address.

17. The multimedia access method of claim 1, wherein the selectively inaccessible peripheral device driver is encrypted and stored at the multimedia receiver, and wherein the authorization data includes an encryption key that allows decryption of the selectively inaccessible peripheral device driver.

18. The multimedia access method of claim 1, wherein the multimedia receiver includes a tablet personal computer.

19. A multimedia receiver, comprising:
a universal serial bus interface;
a network interface to receive an authorization from a multimedia distribution system of a multimedia distribution network, wherein the authorization includes authorization data identifying a peripheral device that is authorized to transfer content data via the universal serial bus interface,
a peripheral device driver selectively inaccessible to the universal serial bus interface, wherein the peripheral device driver is associated with the peripheral device that is authorized to transfer the content data via the universal serial bus interface;
a memory device accessible to a processor, the memory device including instructions executable by the processor to:
provide the universal serial bus interface with access to the peripheral device driver that is selectively inaccessible to the universal serial bus interface in response to receiving the authorization;
receive a request to transfer the content data, wherein the request is received from a particular peripheral device coupled to the universal serial bus interface;
identify the particular peripheral device coupled to the universal serial bus interface;
determine, based on the authorization data, whether the particular peripheral device is authorized to transfer the content data via the universal serial bus interface; and
enable transfer of the content data via the universal serial bus interface when the particular peripheral device is authorized to transfer the content data via the universal serial bus interface.

20. The multimedia receiver of claim 19, wherein the memory device further includes instructions to disable transfer of the content data via the universal serial bus interface when the particular peripheral device is not authorized to transfer the content data via the universal serial bus interface.

21. The multimedia receiver of claim 20, wherein the memory device further includes instructions to:
send a selectable menu to a display device coupled to the multimedia receiver when the particular peripheral device is not authorized to transfer the content data via the universal serial bus interface;
receive a selection of a menu option of the selectable menu that indicates acceptance of a fee; and
send a signal to a server in communication with the multimedia distribution network, wherein the signal indicates the acceptance.

22. The multimedia receiver of claim 19, further comprising a digital video recorder, and wherein the content data is stored at the digital video recorder.

23. The multimedia receiver of claim 19, wherein the authorization data identifies a second peripheral device that is authorized to transfer the content data via the univeral serial bus interface, wherein the univeral serial bus interface is provided with access to a second peripheral device driver that is selectively inaccessible to the univeral serial bus interface in response to receiving the authorization at the multimedia receiver.

24. The multimedia receiver of claim 23, wherein the peripheral device driver that is selectively inaccessible to the univeral serial bus interface is associated with a first media access control address, and wherein the second peripheral device driver that is selectively inaccessible to the univeral serial bus interface is associated with a second media access control address that is different from the first media access control address.

25. The multimedia receiver of claim 19, wherein the peripheral device driver that is selectively inaccessible to the univeral serial bus interface is encrypted, and wherein the authorization data includes an encryption key that allows decryption of the peripheral device driver that is selectively inaccessible to the univeral serial bus interface.

* * * * *